April 14, 1931.  J. LEDWINKA  1,800,547
PRESSED METAL AUTOMOBILE BODY
Filed July 3, 1926   2 Sheets-Sheet 1
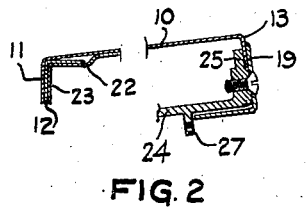
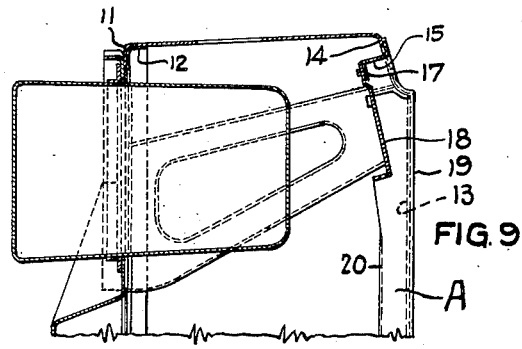
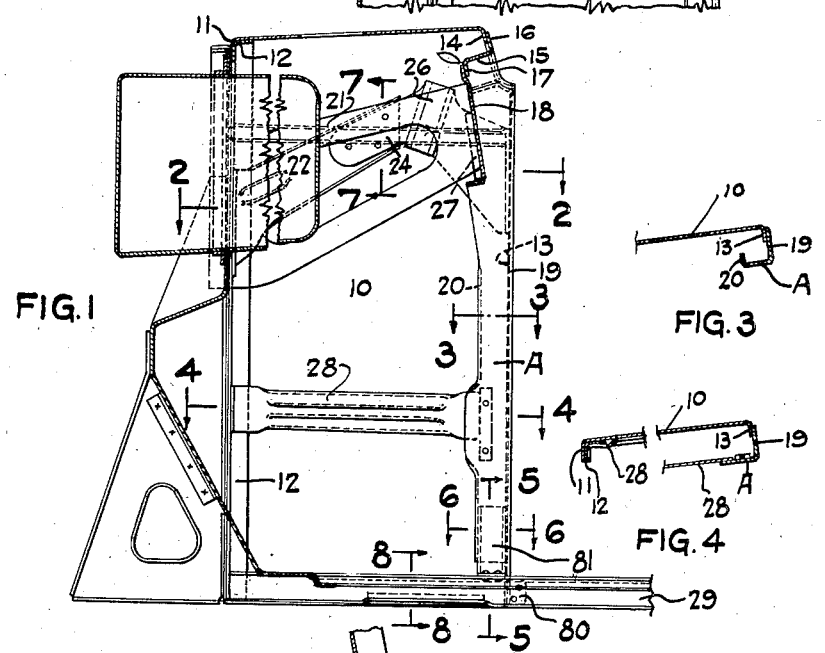
INVENTOR.
JOSEPH LEDWINKA
BY
ATTORNEY.

April 14, 1931. J. LEDWINKA 1,800,547
PRESSED METAL AUTOMOBILE BODY
Filed July 3, 1926 2 Sheets-Sheet 2

INVENTOR.
JOSEPH LEDWINKA
BY
ATTORNEY.

Patented Apr. 14, 1931

1,800,547

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED-METAL AUTOMOBILE BODY

Application filed July 3, 1926. Serial No. 120,306.

This invention relates to pressed metal automobile bodies and relates especially to those bodies which are of the open or touring type.

The chief consideration in the manufacture of automobile bodies has been the problem of obtaining a body which is as light in weight as possible and yet in which there has been no sacrifice of strength. Long experience by the applicant in the manufacture of automobile bodies constructed entirely of pressed metal stampings has proved conclusively that the all-metal body is considerably lighter in weight and at the same time stronger than the usual composite or wooden type of body. One of the chief reasons for this decrease in weight without sacrifice of strength has been due to the particular design of body framework which has been employed and on which the body paneling has been mounted and secured. The applicant has found, however, that by so contouring the body paneling to cooperate with certain cross sections of the major elements of the framework, it becomes possible to utilize to the fullest extent possible that inherent strength and rigidity of the sheet metal paneling itself. It thus becomes possible to obviate to a great extent a number of the frame elements which it was found necessary heretofore to employ. It, accordingly, is the primary object of this invention to so construct a pressed metal automobile body in which is utilized an absolute minimum of framework elements and in which use is made to the greatest possible extent of the inherent strength and rigidity of the body paneling itself.

Not only does the elimination of unnecessary framework elements decrease the weight of the body without sacrificing strength, but it also makes possible the utilization to greatest advantage of the ease with which the body paneling may be contoured for the formation of any particular body design, thus enhancing the external appearance of the automobile. There are no complex cross sections of structural elements and the minimum number of these comparatively simple structural elements combine and cooperate with the paneling of the body to form a complete body effecting the greatest of economy both in the manufacture and assembly thereof.

A still further object of this invention is to provide a form of unit construction effecting economy in the assembly of the several units of the body, these units being (from front to rear of the body) the fuel tank assembly unit, the cowl unit, the side units, and the tonneau unit. A subsidiary object in connection with this last stated object is the provision of a member which serves not only as a bracing and reinforcing element for the cowl unit, but also as a support for the windshield stanchion and for the instrument board of the automobile.

A still further object of the invention is the provision of a front seat unit adapted to be secured in adjusted position longitudinally of the body, the idea being to provide more or less space, as desired, between the toeboard and the front seat.

Other objects of the invention will appear more fully hereinafter.

The invention consists substantially in the construction, combination, location and relative arrangement of parts, all as will be more fully hereinafter set forth and shown in the accompanying drawings, and finally pointed out in the appended claims.

In the accompanying drawings—

Fig. 1 is a longitudinal, vertical section through the cowl portion of the body.

Figs. 2 to 8 inclusive are sections taken on the corresponding lines of Figure 1.

Fig. 9 is a view corresponding to the upper portion of Figure 1, the windshield supporting and reinforcing member not being shown.

Figure 10:
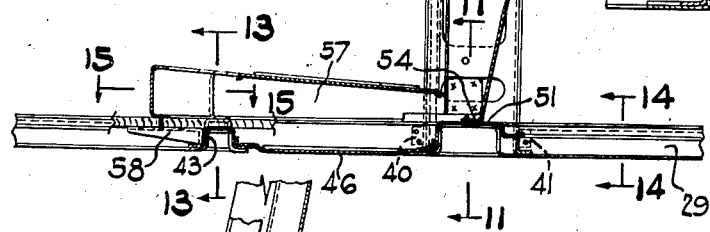
Fig. 10 is a longitudinal, vertical section of the central portion of the body.

Figs. 11 to 15 inclusive are sections taken on the corresponding lines of Fig. 10.

Figure 16:
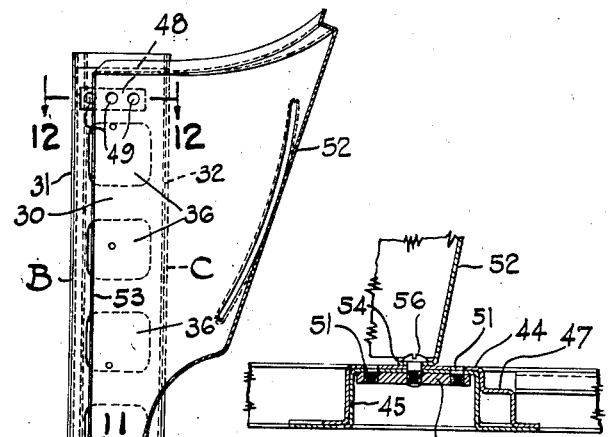
Figure 11:
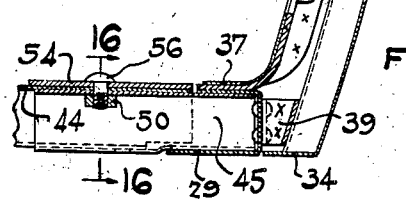

Fig. 16 is a view taken on the line 16—16 of Fig. 11.

Figure 15:
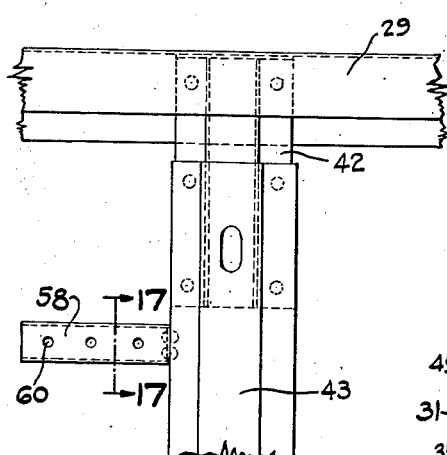
Figure 17:
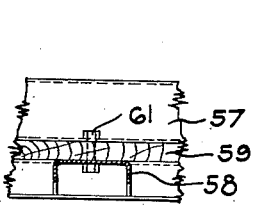
Figure 14:
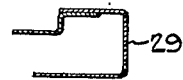
Figure 12:
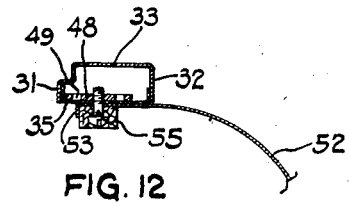
Figure 13:
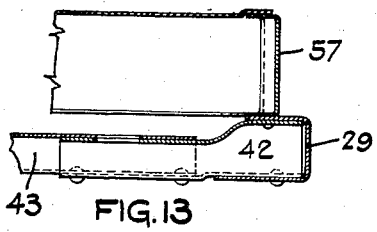

Fig. 17 is a view taken on the line 17—17 of Fig. 15.

The same part is designated by the same reference numeral whenever it occurs throughout the several views.

As has already been indicated, this particular body is built up of a number of sub-assembly units which are adapted to be joined in final assembly to form the completed body. In the drawings, Figure 1 shows generally the cowl unit with which has been assembled the fuel tank and assembly unit. This fuel tank assembly unit forms part of the subject matter of co-pending application Serial No. 119,281, filed June 29, 1926, and is attached to the cowl unit in the manner described in that application. No further reference will be made to this fuel tank assembly in this application excepting to point out that this fuel tank assembly unit includes elements which cooperate and co-act with the other elements forming the component parts of the cowl unit per se to form, when the two units are assembled in final assembly, a very rigid and strong and yet exceedingly simple front unit of the body.

Referring more particularly to the drawings and especially to Figure 1, 10 designates the paneling of the cowl unit which paneling is provided along its forward side and top edges with an inturned flange 11 in the angle of which is nested a U-shaped reinforcing element 12 of generally angle cross section and extending from side to side of the cowl unit across the top thereof. The rear side edges of the cowl panel 10 are provided with inturned vertically-extending flanges 13 forming, with the sides of the cowl panel, inwardly and forwardly-presenting angles. The top rearward edge of the cowl panel is provided with a depending flange 14 to which is secured an instrument board support 15 of substantially Z-cross section and extending transversely between the rear vertical edges of the cowl unit. One branch 16 of this transversely-extending Z member overlies and is secured, preferably by welding, to the rear surface of the depending flange 14 of the cowl panel while the web of this Z member projects forwardly of the cowl and forms the bottom wall of a transversely-extending forwardly-presenting channel formation at the upper rear edge of the cowl unit. The branch 17 of the instrument board support presents downwardly and has secured to its forward face the upper edge of the instrument board 18. Extending vertically along the rear edges of the cowl unit are a pair of front door posts designated generally by the character A. These door posts are generally of channel cross section presenting outwardly of the body, the rear wall 19 of which overlaps and is secured to the vertically-extending inturned flange 13 of the cowl panel. The forward walls 20 constitute, in their extreme upper portions, supports against which the side ends of the instrument board 18 are secured, preferably by welding.

Extending longitudinally of and spaced from the side panel 10 of the cowl unit (see Fig. 7), and constituting a combination windshield stanchion support, an instrument board support and a reinforcing and bracing element, is the member designated generally by reference numeral 21. This member 21 is comprised of two sections, the forward section 22 being of substantially channel cross section (Fig. 7) and having its forward end nested, as at 23, within the vertically-extending angle of the reinforcing element 12 (see Figure 2). The rear section 24 of this member 21 is of substantially heavier gauge stock than the forward section, preferably being in the form of a casting, and is provided at its rear end with an outwardly-turned flange 25 which, together with the main body portion thereof, forms an angle adapted to be nested and secured within the angle formed by the rear wall 19 and the base of the A or front door post. As most clearly appears in Figure 1, the channel shaped section 22 extends rearwardly and upwardly of the cowl unit and receives in its free end the forwardly and downwardly-projecting end of the heavier section 24, the overlapping ends being secured together in any suitable manner. Not only is the rear section 24 of the member 21 provided with a windshield stanchion support 26, but it is also provided with an inwardly-projecting lug or tab 27 which is disposed below but lies substantially in the plane of the downwardly-extending branch 17 of the transversely-extending Z member 15 to form the bottom supports for the instrument board 18. As appears most clearly in Fig. 2, the forward wall 20 of the A post is cut away to allow the rearward projection of the member 24, the base wall of the post having its forward vertical edge lying closely against the instrument board supporting lug 27.

A second reinforcing and bracing member 28 extends longitudinally of the cowl unit and interconnects the forwardly disposed reinforcing element 12 and the rearwardly disposed A post, the side wall 20 of the latter, in the vicinity of the brace 28, being extended forwardly in the plane of the base wall of the channeled door post. The front end of the brace member 28 is secured to the angle member 12 in much the same manner as the front end of the member 21 is connected thereto, while the rear end thereof is slightly offset inwardly to underlie and be secured to the base wall of the front door post.

The intermediate units of this body each include the longitudinally-extending body side sill designated generally by the reference numeral 29 and the vertically-extending intermediate or B and C post designated generally by the reference numeral 30. These body side sills are of substantially channel cross section presenting inwardly of the body and, in the main, similar to the sills which have been described in the above mentioned copending application. The vertically-extending B and C posts 30 are of substantially channel formation presenting inwardly of the body, having side walls 31 and 32 and the base wall 33. The free edges of these side walls 31 and 32 in the lower portion of the post abut against the vertically-disposed base wall of the channeled side sills, while the base wall 33 thereof is extended beyond the bottom ends of the side walls and turned inwardly as at 34 to lie in substantially the plane of the bottom side wall of the sill, this being most clearly shown in Figure 11.

Extending between the side walls of the B and C posts throughout substantially the entire extent of the post is the outwardly-presenting channel shape element 35, the side walls of which are secured to the side walls, respectively, of the B and C post to constitute therewith a post having the characteristics of a box girder. Openings 36 are provided in the member 35 to provide easy access for welding the overlapping walls of the outwardly and inwardly-presenting channel members. The extreme lower portion of the base wall of the channel member 35 is extended beyond the side walls thereof inwardly of the body to overlie the upper wall of the channel side sills, as indicated at 37, this lower portion of the channel 35 being provided with an underlying strengthening element 38 and constituting an effective securing medium for the bottom of the post to the side sill. In the extreme lower portion of the post is a U-shaped clip member 39, the walls of which are secured, preferably by welding, to the walls 31, 32 of the B—C post, these walls being provided with outturned flanges 40 and 41, respectively, for securement to the vertically-disposed portion of the body side sill 29. These flanges 40 and 41 extend exteriorly of the channel of the post, as is most clearly shown in Figure 10.

Secured within the channels of the body side sills 29 and extending inwardly of the body in transverse alignment with each other are a plurality of bracket members 42 substantially of downwardly-presenting channel cross section, the side walls of these channel brackets being provided with outwardly turned flanges having portions thereof overlying and secured to the bottom flange of the body side sills 29. Extending transversely of the body between the main body side sills thereof is a channel shaped cross brace 43 also provided with outwardly-turned flanges, the ends of which brace are adapted to overlie and be supported upon the projecting portions of the transversely aligned bracket members 42. This construction is similar to that which has been described in the above-mentioned co-pending application.

To the rear of the cross member 43, and in transverse alignment with the oppositely disposed B and C posts, is a similarly supported cross brace 44 which cross brace is supported at its ends by the inverted channel shaped brackets 45. The cross brace 44, in the manner similar to the cross brace 43, is provided with oppositely-extending flanges the forwardly-presenting flange constituting the rear transversely-extending support for a seat bottom pan 46. The rear wall of the transversely-extending cross brace 44 is stepped, as at 47, and provides a support for the forward edge of a tonneau section floor board (not shown).

In order to provide for a longitudinal adjustment of the front seat unit with respect to the body, the B and C posts at their upper ends are each provided with a member 48 which is welded or otherwise suitably secured to the inner face of the channel member 35. These members 48 are each provided with a set of spaced, threaded apertures 49 in registry with similarly formed apertures in the member 35. Secured to the under surface of the base wall of the transversely-extending cross brace bracket 45 is a similar member 50, which member is also provided with a set of spaced, threaded apertures 51, and which apertures each lie in the transverse plane of the corresponding apertures in the members 48 mounted in the oppositely-disposed door posts. The front seat back panel 52, which is provided at its forward vertical edges with the inturned flanges 53 and at the bottom thereof with the forwardly turned flange 54, may be secured in any one of a number of positions as defined by the transverse sets of openings 49, 51. Securing elements 55, 56 are threaded into the desired threaded apertures to retain the seat back panel 52 in fixed position. Provision is also made for forward or rearward adjustment of the combination seat cushion support and heelboard 57. This member 57 is of substantially U-shape, the legs of which overlie and are secured to the tops of the main body side sills in the manner shown in Figure 13, while the transversely-extending portion which constitutes the heelboard of the side unit is disposed forwardly of the transverse cross brace 43. In order to provide an efficient and rigid support for this transverse heelboard portion of the member 57, a plurality of forwardly-projecting brackets 58 are employed, the rear ends of which are secured to the forwardly-disposed wall of the cross brace 43. These brackets are of substantially channeled cross section (see Figure 7), the base of which is disposed substantially in the plane of the base wall of the cross brace 43 to constitute therewith a support for the front floor board 59. Each of the brackets 58 is provided with a series of longitudinally spaced threaded apertures 60 adapted to receive securing element 61 for retaining the forward edge of the heelboard in any one of a plurality of positions.

The final assembly unit joints are effected in the usual manner at the bases of the front or A door post and the rear or D door post. In the case of the joint at the base of the A door post, the side wall 19 thereof is provided with a rearwardly turned tab 80 which is secured by welding or otherwise to the vertically-disposed outer face of the main body side sill 29. A channel member 81 presenting outwardly of the body is disposed within the A post at the bottom thereof and has the base thereof extending beyond the side walls thereof to overlie, as at 82, the top of the body side wall to effect a joint which is very similar to that used for joining the B and C posts to the main body side sills. This is most clearly shown in Figures 5 and 6. The final assembly unit joint at the base of the rear door post is exactly similar to that which was described in the copending application hereinbefore referred to, use being made of an angle member, the forward portion of which is nested in an angle of the body side sill and the rear portion of which is nested in the tonneau side sill, the exterior portions of the adjacent main body and tonneau side sills being embraced by the lower body portion and bottom flange of the D post bracket.

What is claimed as the applicant's invention, and what is desired to be secured by United States Letters Patent is:

1. In a pressed metal automobile body, a cowl panel provided with a vertically-extending reinforcing element along its forward vertical edge, and a vertically-extending door post along the rear vertical edge thereof, a channel shaped pressed metal member having one end thereof secured to said forwardly-disposed reinforcing element with the free end thereof extending rearwardly, and a second member adapted to support a windshield stanchion and having one end thereof secured to said vertically-extending door post and the other end thereof extending forwardly and adapted to be nested within and secured to the said rearwardly-extending channel member.

2. In a pressed metal automobile body, a cowl unit including a cowl panel, and a member extending longitudinally of and spaced from the side of said cowl panel, said member having the ends thereof secured, respectively, to the front and rear vertical edges of said cowl unit, a lug intermediate the ends of said member and constituting a support for the side edge of an instrument board, and an instrument board secured to said lug.

3. In a pressed metal automobile body, a cowl unit including a cowl panel, a transversely-extending member having one branch thereof secured to the rear upper edge of said panel while the other branch thereof projects downwardly, in combination with a bracing member interconnecting the front and rear edges of said cowl unit, said bracing member being provided with an inwardly-projecting lug lying substantially in the plane of said downwardly-projecting branch of said transversely-extending member, whereby said lug and downwardly projecting branch form seats for supporting an instrument board.

4. In a pressed metal automobile body, a longitudinally-extending body side sill having a vertically-disposed outer portion in combination with a vertically-extending door post of substantially channel cross section, the free edges of the walls of the post at the bottom thereof abutting against said vertically-disposed portion of the body side sill, and a bracket member of substantially channel cross section the walls of which are secured, respectively, to the walls of said door post and are provided with outturned flanges projecting exteriorly of the walls of the door post for securement to said vertically-disposed portion of the side sill.

In testimony whereof I hereunto affix my signature.

JOSEPH LEDWINKA.